C. P. WALLICK.
CELERY TRENCHER.
APPLICATION FILED JAN. 19, 1918.
1,316,987.
Patented Sept. 23, 1919.
7 SHEETS—SHEET 1.
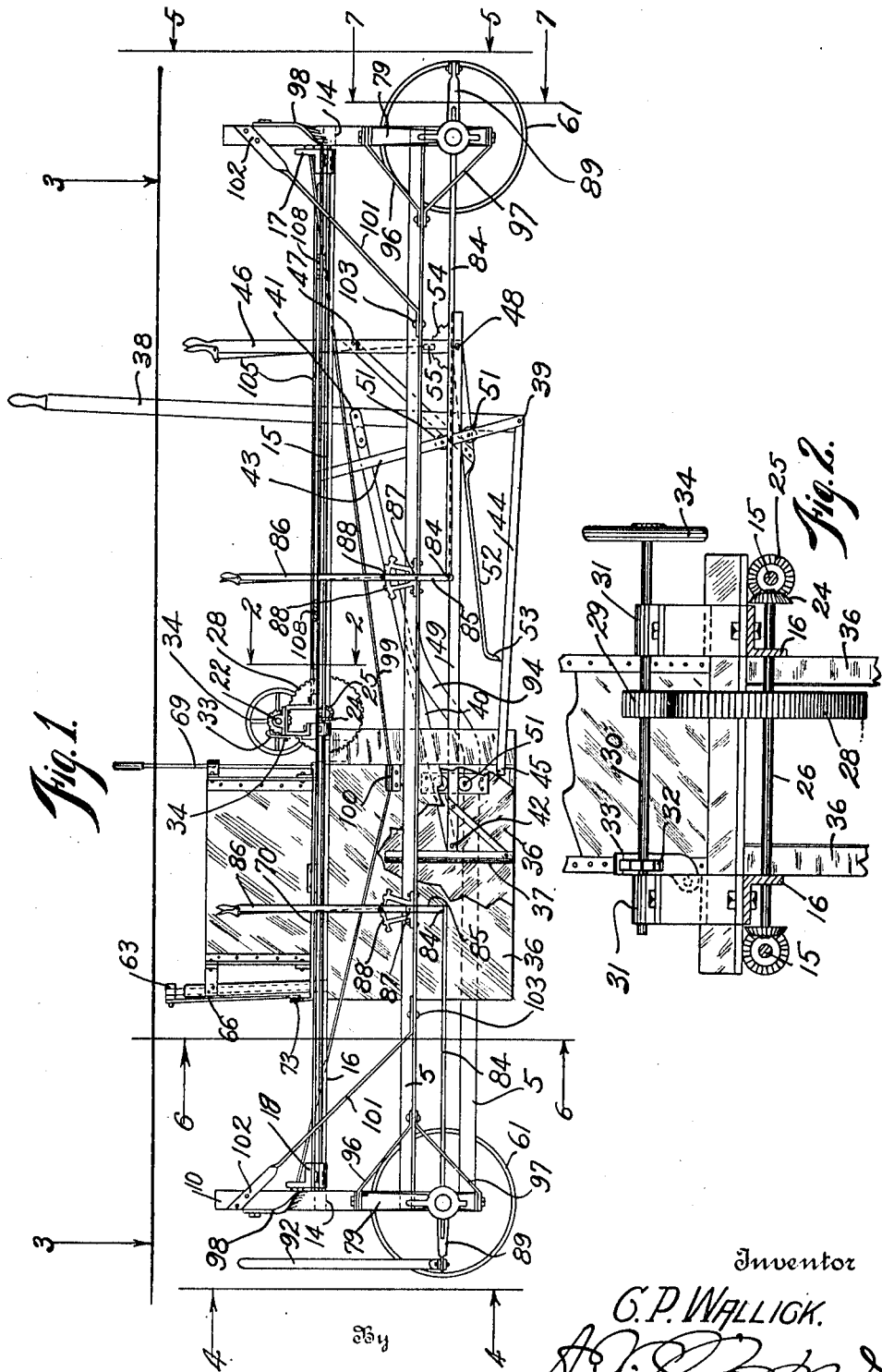
Inventor
C. P. WALLICK.

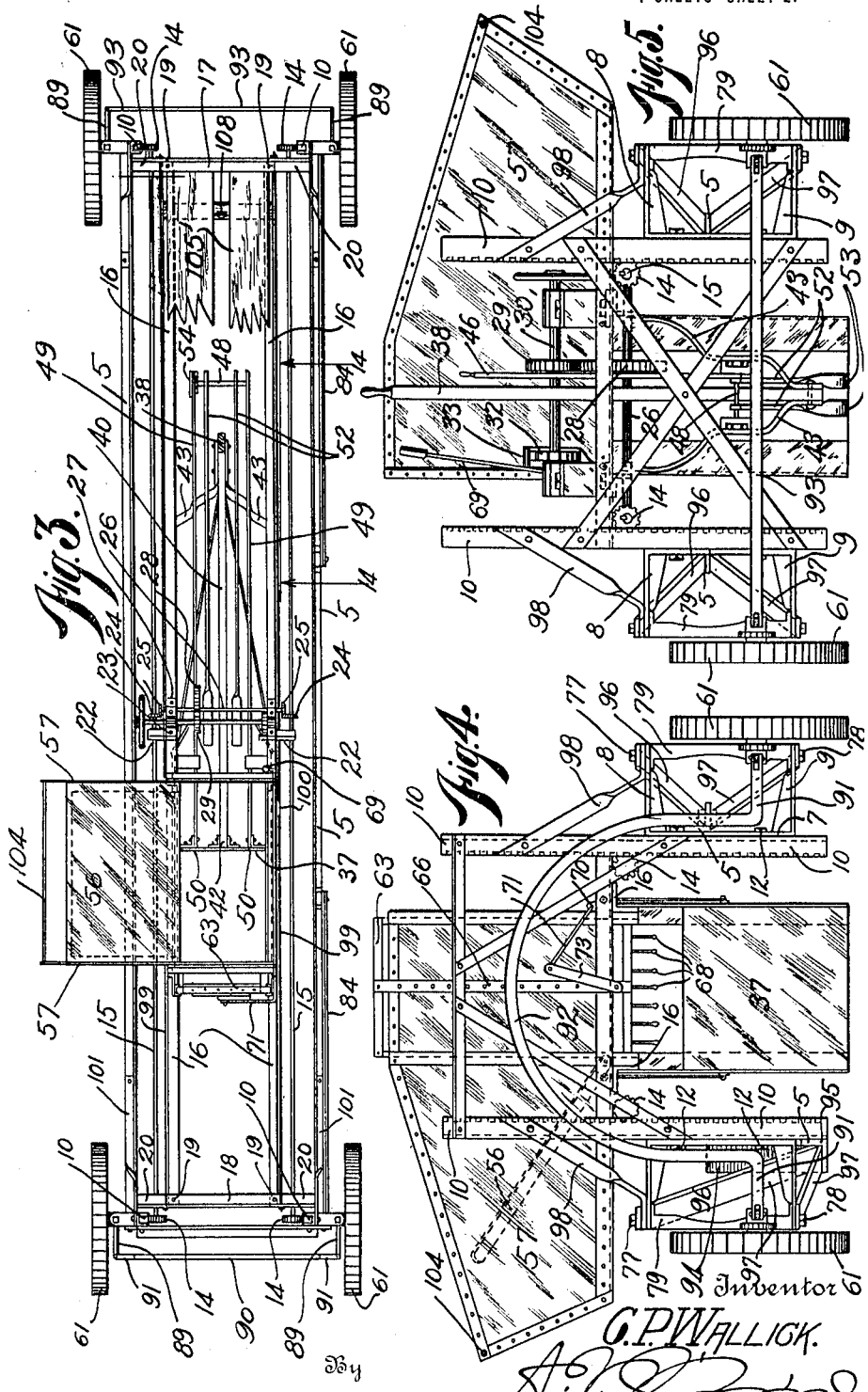

C. P. WALLICK.
CELERY TRENCHER.
APPLICATION FILED JAN. 19, 1918.

1,316,987.

Patented Sept. 23, 1919.
7 SHEETS—SHEET 3.

Inventor
C. P. Wallick.
By
Attorney

C. P. WALLICK.
CELERY TRENCHER.
APPLICATION FILED JAN. 19, 1918.

1,316,987.

Patented Sept. 23, 1919.
7 SHEETS—SHEET 4.

Inventor
C. P. Wallick.
By A. L. O'Brien
Attorney

C. P. WALLICK.
CELERY TRENCHER.
APPLICATION FILED JAN. 19, 1918.

1,316,987.

Patented Sept. 23, 1919.
7 SHEETS—SHEET 5.

Inventor
C. P. WALLICK.
By
Attorney

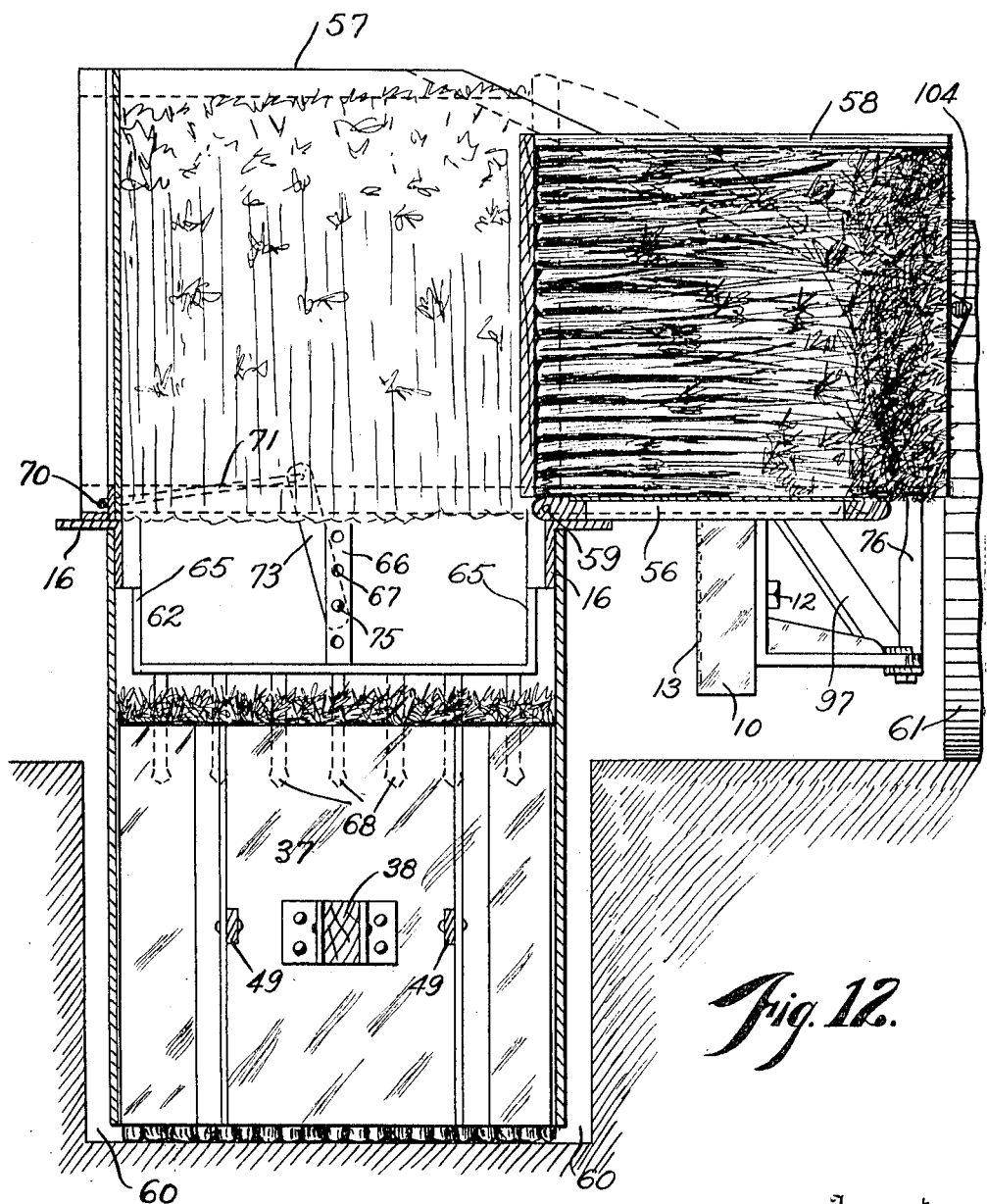

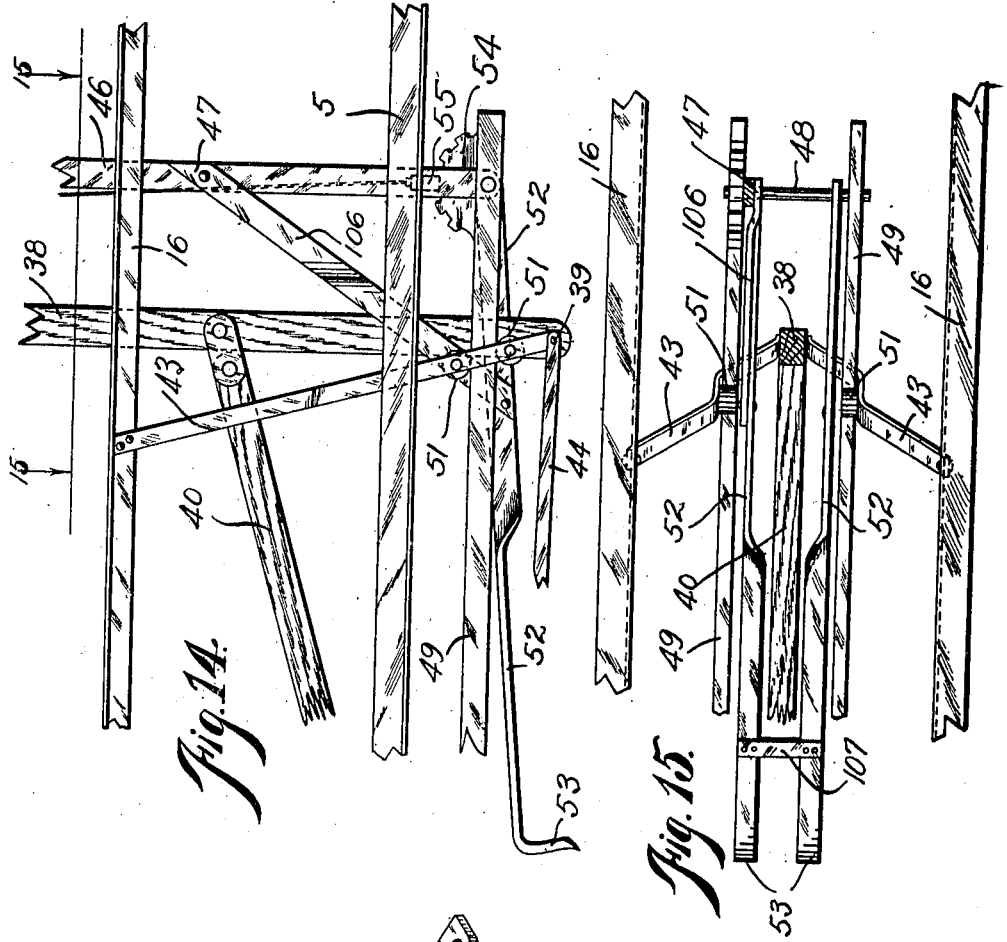
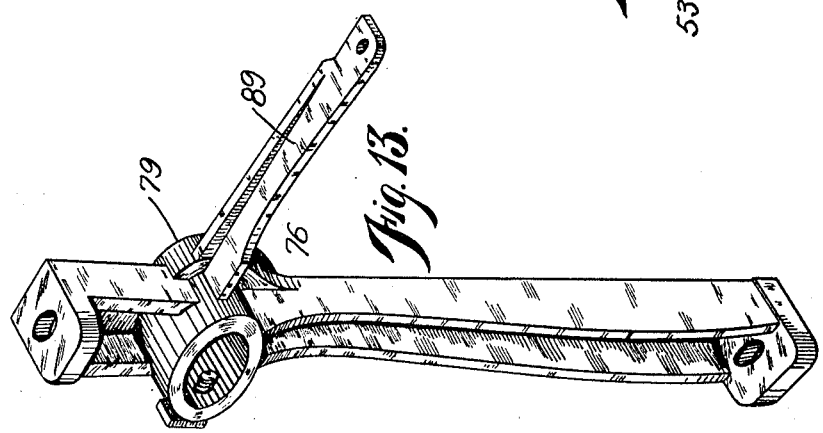

UNITED STATES PATENT OFFICE.

CARL P. WALLICK, OF WHEATRIDGE, COLORADO.

CELERY-TRENCHER.

1,316,987. Specification of Letters Patent. Patented Sept. 23, 1919.

Application filed January 19, 1918. Serial No. 212,759.

*To all whom it may concern:*

Be it known that I, CARL P. WALLICK, a citizen of the United States, residing at Wheatridge, in the county of Jefferson and State of Colorado, have invented certain new and useful Improvements in Celery-Trenchers; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for placing celery in trenches. In practising the invention, the celery collected in quantities is placed in trenches formed in the ground, the celery being taken after a summer's growth and placed in these trenches in which it develops in such a manner as to produce a remarkably high quality of the product.

So far as I am aware, heretofore this trenching of the celery has been accomplished by hand, alone, without the aid of any apparatus or machinery. My object is to provide an apparatus, or machine, which I call a celery trencher, which may be utilized for this work, and whereby the work may be accomplished with much greater facility than where the work is done by hand and without the aid of any mechanism.

Generally speaking, my improvement consists of a construction mounted on wheels which form supports for axles, the wheels being arranged on opposite sides of the trench in which the celery is to be placed. The wheels support a relatively stationary frame. A second, vertically movable frame is carried by the stationary frame and is adjusted whereby a box, open at both ends, may be raised and lowered into the trench. During the celery trenching operation, this open-ended box or casing is lowered into the trench through the medium of shafts and gears coöperating with the relatively stationary framework supported by the wheels, as aforesaid. Within this open-ended casing, a follower is mounted to reciprocate and is actuated through the medium of a suitable lever whereby the celery as it is placed in the casing is crowded into place. Provision is also made for supporting the celery when so placed in position, by the action of the follower while the latter is withdrawn for the purpose of placing another charge of the celery in position.

The quantity, or charge, of celery acted on by the follower at any particular time is first placed in a box which is open at the top and on one side, the open side being that through which the tops of the celery stalks project. This box is then placed upon a casing, or support, which projects laterally beyond the trench. The box is then removed, leaving the charge of celery upon a pivoted plate which when moved upon its pivot deposits the charge of celery within the casing, for trenching purposes, after which this charge is acted upon by the follower, the operation being repeated until all the celery to be trenched is in place.

Having briefly outlined my improvement, I will proceed to describe the same in detail, reference being made to the accompanying drawing in which is illustrated an embodiment thereof. In this drawing:

Figure 1 is a side elevation of my improved celery trencher, shown in position for use.

Fig. 2 is a section taken on the line 2—2, Fig. 1, looking toward the left, the parts being shown on a larger scale.

Fig. 3 is a top plan view of the construction shown in Fig. 1, being a view looking in the direction of arrows 3, Fig. 1.

Fig. 4 is an end view of the apparatus, looking in the direction of the arrows 4, Fig. 1, the parts being shown on a larger scale.

Fig. 5 is a view of the opposite end of the apparatus, or a view loking in the direction of the arrows 5, Fig. 1, the scale being the same as in Fig. 4.

Fig. 12 is a cross section taken on the line 12—12, Fig. 11, looking toward the left.

Fig. 13 is a perspective view of the hub post shown in the position illustrated in Fig. 9, or with its shorter member uppermost.

Fig. 14 is a fragmentary side elevation of the structure.

Fig. 15 is a section taken on the line 15—15, Fig. 14, looking downwardly.

The same reference characters indicate the same parts in all the views.

Figure 6:
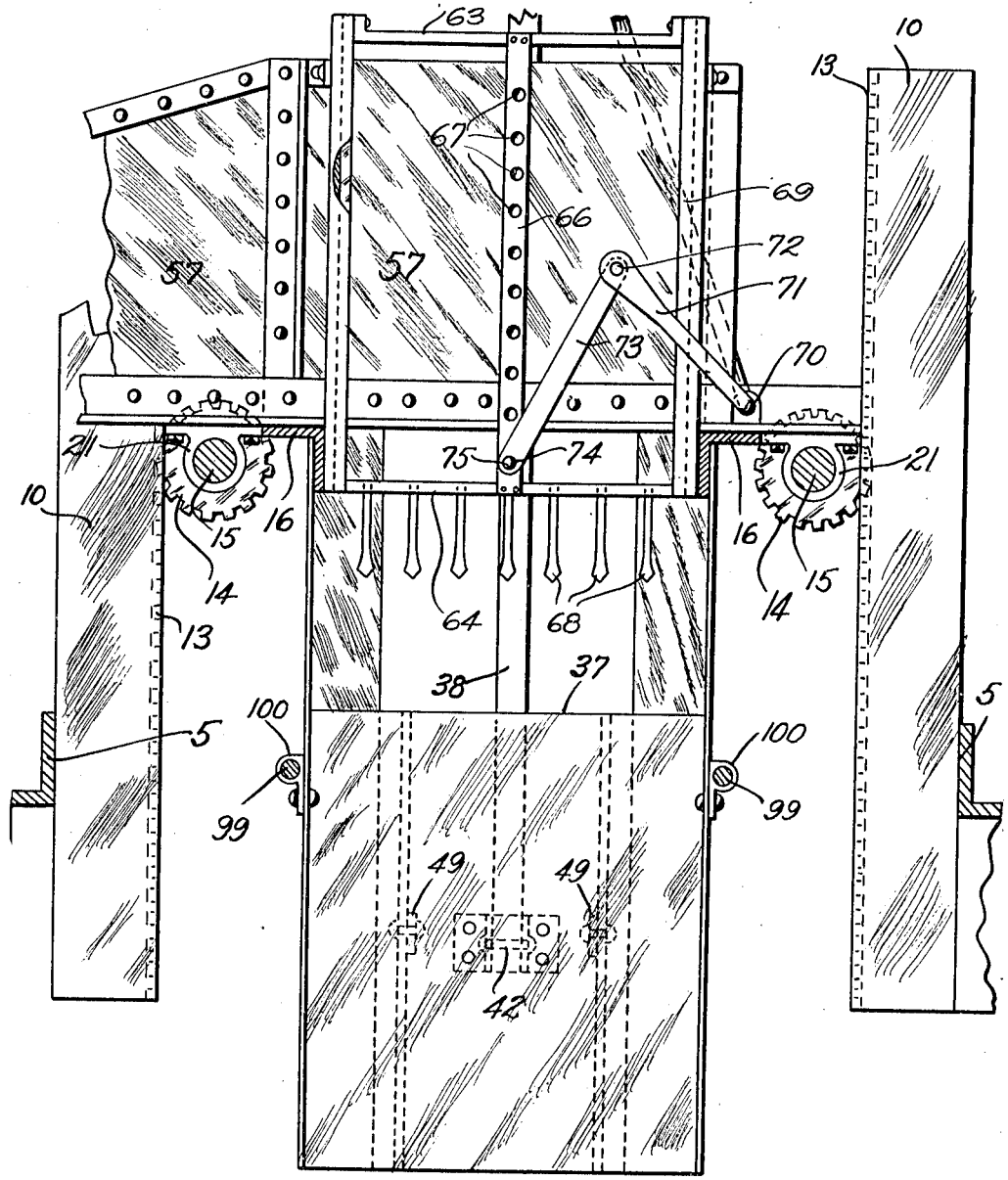
Fig. 6 is a section taken on the line 6—6, Fig. 1, looking toward the right, the parts being shown on a much larger scale.
Figures 7, 9:
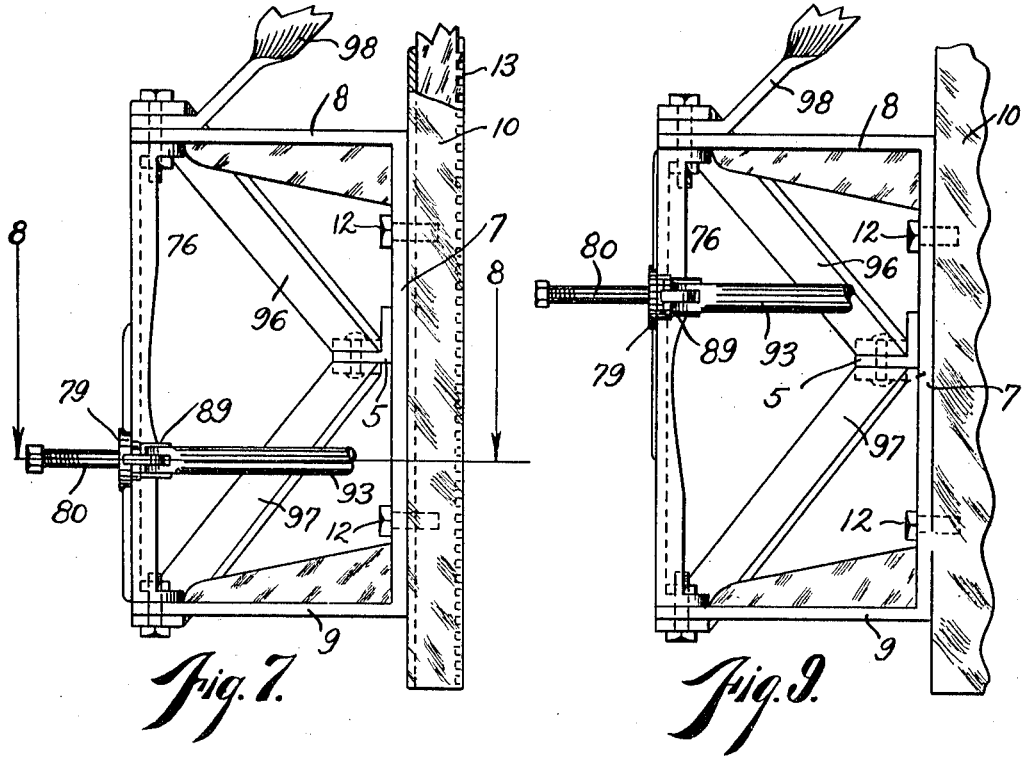
Fig. 7 is a fragmentary section taken on the line 7—7, Fig. 1, looking toward the left, the parts being shown on a much larger scale.
Fig. 9 is a view similar to Fig. 7 but with the hub post member reversed.

Let the numeral 5 designate each of two angle bars which extend lengthwise of the machine, are arranged in parallel relation and suitably spaced, the opposite extremities of these bars being secured to brackets 6, each of which is composed of a vertically disposed member 7 and top and bottom parallel members 8 and 9, the extremities of the angle bars 5 being secured intermediate the extremities of the vertical members 7, as well illustrated in Figs. 7 and 9. Each bracket 6 is secured to a vertically disposed upright 10 by means of stud bolts or other suitable fastening devices 12. These uprights are toothed or cogged on their interior faces, as shown at 13, and are adapted to form tracks for toothed wheels 14 which are made fast to the opposite extremities of two shafts 15 which are journaled in the framework of the vertically movable structure which will now be described. Two longitudinally disposed angle bars 16 are suitably spaced and connected at their opposite extremities by cross-bars 17 and 18, the connection being indicated at 19, in Fig. 3. The cross-bars 17 and 18 of this stationary frame extend laterally beyond their connection with the longitudinal bars 16, as shown at 20, the shafts 15 being journaled in bearings 21 supported by these cross-bar extensions. Furthermore, the two shafts 15 are centrally journaled in projections 22 which are supported by the bars 16 to which they are secured, as shown at 23 (see Fig. 3). Each shaft 15 carries intermediate its extremities and about central of its length a bevel gear 24 which meshes with a similar gear 25 fast on the adjacent extremity of a transverse shaft 26, which is journaled in bearings 27 carried by the bars 16. The shaft 26 is also equipped with a relatively large gear 28 which meshes with a small gear 29 fast on a shaft 30, journaled in bearings 31, mounted on the vertically movable framework of the structure (see Fig. 2). Furthermore, the shaft 30 is provided with a ratchet wheel 32 which is engaged by a pawl 33, which is pivotally mounted on the framework, as shown at 34. When the shaft 30 is turned in one direction, the pawl 33 by virtue of its engagement with the ratchet will lock the shaft against the return movement until the pawl is disconnected from the ratchet. Any suitable pawl and ratchet or other arrangement may be employed in connection with the operating shaft 30. Hence it must be understood that the invention is not limited to details of construction, since these details may be of any form that mechanical skill or judgment may suggest or dictate. One extremity of the shaft 30 is provided with a hand wheel 35 to facilitate the manipulation of the shaft.

From the foregoing description it will be understood that as the shaft 30 is rotated, rotary movement will be imparted to the shaft 26 and through the medium of the gearing connection between this shaft and the shafts 15, the latter will be rotated and cause their toothed wheels 14 to travel vertically either up or down upon the uprights 10 of the stationary framework, whereby the entire vertically movable member of the apparatus will be moved either upwardly or downwardly, as may be required.

The object of the vertical movement of this member of the framework, is to make it practicable to lower an open-ended casing or box 36 in which moves a reciprocable follower 37, the latter being operated by a hand lever 38 which is fulcrumed at its lower extremity, as shown at 39, and connected with the follower through the medium of a rod 40, this rod being pivotally connected with the lever above its fulcrum, as shown at 41, and pivotally connected with the follower, as shown at 42. The fulcrum 39 for the lever 38 is mounted in stationary supports 43 and 44, the supports 43 extending upwardly from the fulcrum, and the supports 44 extending rearwardly therefrom and being connected with the casing 36, as shown at 45. It will be understood that any suitable provision may be made for fulcruming this lever upon the vertically movable framework.

Figures 8, 10:
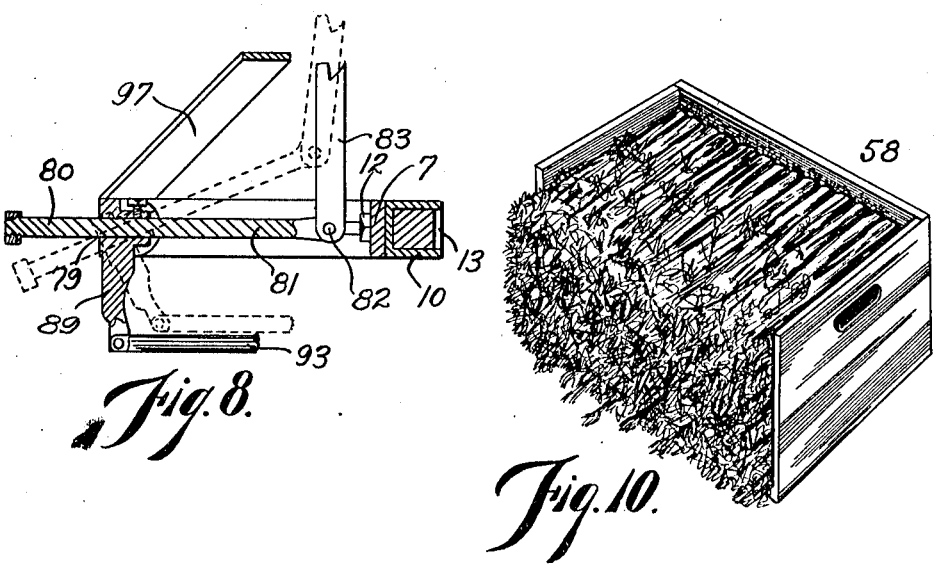
Fig. 8 is a horizontal section taken on the line 8—8, Fig. 7, looking downwardly.
Fig. 10 is a perspective view illustrating the manner of assembling the celery stalks in a box, preparatory to placing them in the trench through the medium of my improvement.

A second lever 46 is secured at its lower extremity to a rock spindle 48 which is journaled in two bars 49, at the forward extremities of the latter, the rear extremities of these bars being connected with the follower 37, as shown at 50. The two bars 49 pass between upper and lower anti-frictional rollers 51 which are suitably supported upon the vertically movable frame member, there being two sets of these members for each bar, one set being located considerably in the rear of the other set, thus properly distributing the anti-frictional guide means for the said bars. Furthermore, two arms 52 are secured to the rock spindle 48 at their forward extremities, while their rear extremities are turned downwardly, as shown at 53, whereby they are adapted to dig into the earth in the bottom of the trench when the lever arm 46 is properly manipulated. A quadrant 54 is supported upon one of the bars 49 and its teeth are engaged by a pawl 55 which is adjustable in the usual manner for locking the lever arm, as well as the arms 52, in the desired position of adjustment. It will thus be noted that the lever arm 46, together with the rearwardly extending arms 52 and the rock spindle 48, are connected to move in unison, whereby the rearward extremities of the arms 52 may be forced into the earth a sufficient distance to accomplish the purpose hereinafter explained, the bars 49 being pivotally connected with the rock spindle 48 at one extremity and with the follower 37 at their opposite extremities. By virtue of this arrangement, the arms 52 relieve the celery, which is acted on by the follower in the casing, from undue pressure. It should be explained that as the follower is actuated and subjects the celery to pressure in the casing when the latter occupies the trench, the wheeled structure is moved forwardly, or toward the right, (referring to Figs. 1 and 3) so that the machine is automatically adjusted to receive successive charges of celery, each charge being placed in front or at the right of (referring to the said views) the charge previously acted upon by the follower. This automatic movement of the machine brings a laterally projecting platform 56, carried by the vertically movable framework of the machine, into position directly opposite the space forward of the last charge of celery. This platform or support 56 is open at both ends and provided with upwardly projecting parallel sides 57 (see Figs. 4 and 5). The charge of celery is placed in a box 58 (see Fig. 10), which is open at the top and on one side, allowing the tops of the celery stalks to protrude. The charge having been deposited in this box, the latter is turned upside down upon the laterally projecting platform 56, whereby it occupies the position shown in Fig. 12, the open top of the box being lowermost. The box is then lifted from the charge of celery which then lies upon the platform 56, between the two sides 57. This platform member 56 is hingedly connected with the vertically movable framework of the machine, as shown at 59, and the user, as soon as the box 58 is removed, tilts the platform 56 on its hinge 59 and allows the charge of celery to drop downwardly into the casing 36, the latter being in the trench 60. The follower, which had previously been moved forwardly for the purpose and now occupies a position forward of the new charge of celery, is again moved rearwardly, whereby the new charge is pressed against the preceding charge. This pressure acts both on the celery and re-acts to move the machine forwardly on its ground wheels 61. The object of the arms 52 is to relieve the celery from a portion of the pressure required in order to produce the necessary reaction for moving the machine on its ground wheels, as heretofore explained. The pressure exerted on the follower 37, through the medium of the lever 38, is partly resisted by the arms 52 which engage the ground during the movement of the follower, thus making it practicable to employ the necessary force to move the machine forwardly through the reaction of such force, without exerting undue pressure upon the rather delicate celery stalks. In order to disengage the rear extremities of the arms 52 from the ground, it is only necessary to properly adjust the rock spindle 48, through the medium of the lever arm 46, and pawl 55 and its co-operating quadrant 54. In order to hold the last charge of celery in the upright position in the casing 36 during the rearward movement of the follower, and until the next charge is put in place, I employ a vertically movable skeleton frame 62, consisting of upper and lower bars 63 and 64, connected by vertically disposed side bars 65 and a central bar 66, provided with perforations 67. The bottom rail or member 64 of this skeleton frame is provided with a number of teeth or downwardly extending projections 68 adapted to move downwardly far enough to engage the upper portion of the charge of celery, as well illustrated in Figs. 11 and 12. This vertically adjustable skeleton frame, or gate, is actuated through the medium of a lever arm 69 which is fast at its lower extremity on a rock shaft 70, the opposite extremity of said shaft being equipped with a crank arm 71 pivotally connected, as shown at 72, with a link 73, the opposite extremity of the link being pivotally connected, as shown at 74, with the perforated member 66. The link 73 is connected with the member 66 by means of a pin 75 which passes through a perforation in the adjacent end of the link and a registering perforation 67. By virtue of the latitude of adjustment allowed by reason of the series of perforations in the member 66, any desired degree of vertical movement may be imparted to the gate carrying the separating teeth 68, as heretofore described.

The general structure of the machine may be varied within a considerable range without departing from the spirit of the invention, as will be readily understood. Some of the details which are quite fully illustrated in the drawing will now be described. There are four U-shaped brackets 6 which are respectively secured to the toothed bars 10 and with which are connected the opposite extremities of the angle bars 5, as heretofore explained. Pivotally connected to the outer extremities of the upper and lower arms 8 and 9 of each bracket 6 is a hub post 76 which is of peculiar construction, its upper and lower extremities being pivoted to the bracket, as shown at 77 and 78. Between the extremities of this post a hub 79 is formed which receives and is secured to a stub axle 81. Each of the ground wheels 61 engages a journal member 80 of this stub axle, the opposite or inner extremity of each of two of these axles (one in front and one in the rear) being pivotally connected (as shown at 82) with a rod 83, the opposite extremity of the rod being connected (as shown at 84) with the lower arm 85 of a lever 86, the latter being fulcrumed (as shown at 87) and equipped with a pawl, controlled in the usual manner, and coöperating with a quadrant 88. These levers serve to steer the machine, one of the levers being employed to shift the forward wheels and the other the rear wheels. Each of the hub posts 76 has an arm 89 which extends forwardly from the hubs of the forward wheels and rearwardly from the hubs of the rear wheels. These arms 89 of the rear wheels are connected by a rod 90, which has shortened horizontal members 91 and an upwardly bowed intermediate member 92, whereby, when the corresponding lever 86 is actuated (which lever is directly connected with one of the stub axles of the rear wheel) both of the wheels are correspondingly operated for steering purposes. Again, the arms 89 of the forward hub posts are connected by a rod 93, whereby, as the corresponding or forwardly located lever 86 is actuated, both of the forward wheels are correspondingly shifted for steering purposes.

In order to make room for the laterally projecting hinged platform 56 when the vertically movable frame structure is at its lowest limit of movement in order to lower the casing 36 into the trench 60, one of the longitudinally disposed angle bars 5 of the relatively stationary framework is bent downwardly from a point about midway of its length, (as shown at 94) after which it is continued rearwardly and secured to the lower extremity of the corresponding post 10, as shown at 95 (see Fig. 4).

Attention is called to the fact that the hub posts, together with the brackets 6, are further connected with the frame bars 5 of the machine by braces 96 and 97, the former being connected with the tops of the hub posts, while the latter are connected with the lower extremities of said posts. At the left of Fig. 4, the braces 96 and 97 are shaped slightly differently from the corresponding braces on the other bars of the machine, due to the fact that the frame or angle bar 5 on this side of the machine is bent downwardly, whereby the part with which these particular braces are connected is in a lower position than at the opposite or right hand side of the machine, still referring to Fig. 4. The relatively stationary framework, upon which the vertically movable structure is mounted, is further strengthened by braces 98, as best illustrated in Figs. 4 and 5.

The vertically movable member of the frame, carrying the casing 36, is strengthened by truss rods 99 which are connected with the opposite extremities of the angle bars 16 at one extremity and with the casing 36 at their opposite extremities, as shown at 100. The relatively stationary frame, including the longitudinally disposed angle bars 5, is further strengthened by braces 101 (see Fig. 1), one extremity of each brace being connected with one of the toothed posts 10, as shown at 102, while its opposite or lower extremity is connected with an angle bar 16, as shown at 103.

From the foregoing description, the use and operation of my improved celery trencher will be readily understood. A trench 60 is first formed, of suitable length and depth, after which the machine is placed in position whereby the ground wheels 61 engage the bank on opposite sides of the trench. The vertically movable framework of the structure is then lowered to place the casing 36 in the trench, this being accomplished by the proper manipulation of the shaft 30, which has a gearing connection with the shaft 26, the latter being geared to the longitudinally disposed shafts 15, the gear wheels 14 of the latter in turn engaging the toothed faces 13 of the uprights 10, these uprights forming vertically disposed rails upon which the vertically movable member of the frame travels downwardly for the aforesaid purposes. Charges of celery are then successively placed in the casing, the latter having been lowered into the trench, each charge being acted on by the follower 37, which is manipulated through the medium of the hand lever 38, as heretofore explained. After each charge of celery is moved into position, the toothed gate 62 is lowered to the position shown in Fig. 12, through the instrumentality of the lever arm 69, the rock shaft 70, the crank arm 71, and the link 73 which is connected with the perforated member 66 of the toothed gate. As each charge of celery is moved into place by the action of the follower, the pressure of the latter upon the celery, in cooperation with the arms 52 which dig into the ground as heretofore explained, causes the machine to travel forwardly or in a direction opposite that toward which the pressure of the follower is exerted upon the celery, the arms 52 being employed to relieve the celery from undue pressure during the operation of the machine.

Figure 11:
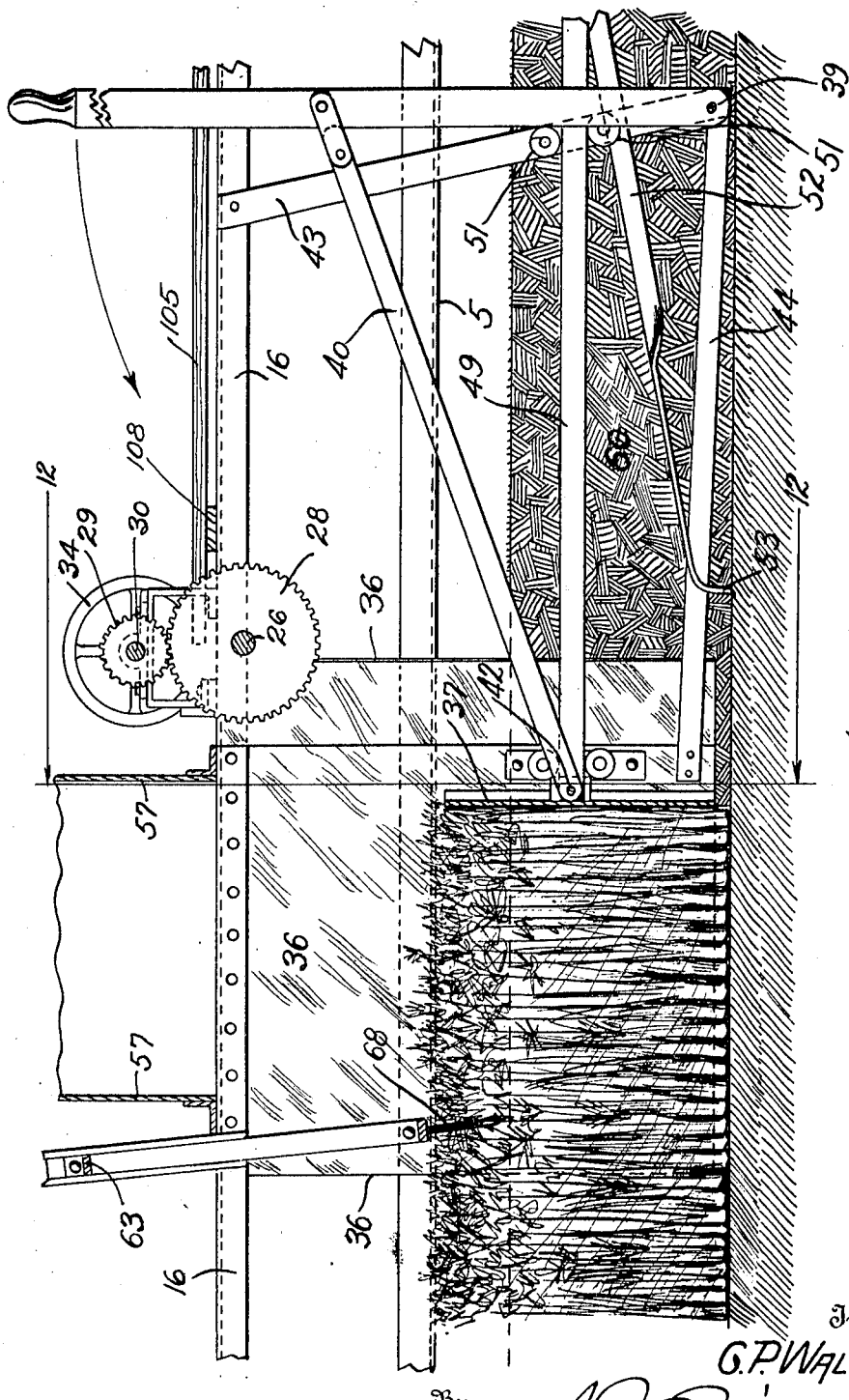
Fig. 11 is a fragmentary longitudinal section of the apparatus taken on the line 11—11, Fig. 3, the parts being shown on a much larger scale.

Attention is called to the fact that the person in charge of my improved machine should stand upon a platform 105 carried by the vertically movable member of the structure and directly supported by the stationary frame bars 16, the cross bar 17 and an additional transverse supporting part 108 (see Fig. 11).

The transversely extending part of the upper portion of the casing having the sides 57, is provided with the rest rod 104 upon which the box 58 may be rested preparatory to inverting it, or preparatory to moving it to the position illustrated in Fig. 12. This rod is a great convenience in manipulating the box 58.

Attention is called to the fact that when it is desired that the vertically movable member of the structure shall be in a relatively low position or in a low position with reference to the journals 80 and the wheels which engage these journals, the hub posts 76 will all be placed in the position shown in Fig. 9 or simply inverted from the position shown in Fig. 7. In this event, the two forward hub posts will be placed in the rear and the two rear hub posts in the front, in order that the projections 89 will extend in the proper direction; that is to say, rearwardly for the hub posts at the rear end of the machine and forwardly for the hub posts at the forward end of the machine.

Having thus described my invention, what I claim is:

1. A celery trencher including a main frame mounted on ground wheels, and an auxiliary frame member carried by the main frame, vertically adjustable thereon and provided with a casing adapted to enter the trench while the ground wheels are disposed on opposite sides thereof and a laterally projecting platform hinged to the upper portion of the casing to be above the trench.

2. A celery trencher including a main frame mounted on ground wheels, an auxiliary frame member carried by the main frame, vertically adjustable thereon and provided with a casing adapted to enter the trench while the ground wheels are disposed on opposite sides thereof, and a follower mounted to reciprocate in the casing.

3. A machine of the class described including a main frame mounted on ground wheels, an auxiliary frame member carried by the main frame, vertically adjustable thereon and provided with a casing adapted to enter a trench while the ground wheels are disposed on opposite sides thereof, a follower mounted to reciprocate in the casing, and means carried by the auxiliary frame member for actuating the follower.

4. In apparatus of the class described, the combination of a main frame mounted on ground wheels and an auxiliary frame member carried by the main frame, vertically adjustable thereon and provided with a casing adapted to enter a trench while the ground wheels are disposed on opposite sides thereof, the rear end of the casing being open to allow the machine to travel forwardly and leave the celery in the trench, and a follower mounted to reciprocate in the casing.

5. A celery trencher comprising a main frame mounted on ground wheels, an auxiliary frame member carried by the main frame, vertically adjustable thereon and provided with a casing adapted to enter a trench while the ground wheels are disposed on opposite sides thereof, a follower mounted to reciprocate in the casing, and means carried by the frame and connected with the follower for applying force to the follower in the rearward direction, which force drives the machine forwardly by reaction.

6. A celery trencher comprising a main frame mounted on ground wheels, an auxiliary frame member carried by the main frame, vertically adjustable thereon and provided with a casing adapted to enter a trench while the ground wheels are disposed on opposite sides thereof, a follower mounted to reciprocate in the casing, and means carried by the frame and connected with the follower for applying force to the follower in the rearward direction, which force drives the machine forwardly by reaction, said means including an element which enters the ground and relieves the celery from part of the force applied to the follower.

7. A celery trencher comprising a main frame mounted on ground wheels, an auxiliary frame member carried by the main frame, vertically adjustable thereon and provided with a casing adapted to enter a trench while the ground wheels are disposed on opposite sides thereof, and a follower mounted to reciprocate in the casing, the rear end of the casing being open to allow the machine to travel forwardly and leave the celery in the trench as the follower applies pressure to the celery in the rearward direction.

8. A celery trencher including a main frame mounted on ground wheels, an auxiliary frame carried by the main frame and provided with a casing adapted to enter a trench while the ground wheels are disposed on opposite sides thereof, a follower mounted to reciprocate in the casing, the rear extremity of the casing being open, and a lever fulcrumed on the frame and connected in operative relation with the follower.

9. A celery trencher including a main frame mounted on ground wheels, an auxiliary frame adjustable on the main frame and carrying a casing adapted to enter a trench while the ground wheels occupy positions on opposite sides thereof, a follower mounted to reciprocate in the casing, means for actuating the follower, bars connected with the follower at one extremity and extending forwardly therefrom, guide means mounted on the frame for supporting the said bars, a rock spindle journaled in the said bars, a lever arm fast on the rock spindle, and arms also fast on the rock spindle at their forward extremities, extending rearwardly therefrom, and adjustable, to cause them to enter the ground and in part resist the force applied to the follower, the reaction of which force causes the machine to travel forwardly when in use.

10. A celery trencher comprising a main frame mounted on ground wheels, an auxiliary frame carried by the main frame, the auxiliary frame having a casing extending above the main frame and also downwardly into a trench while the machine is in use, a follower mounted in the casing, means for actuating the follower, and means connected with the follower and adapted to enter the ground for resisting in part the force applied for imparting the rearward movement to the follower, whereby such force may be sufficient to cause the machine to travel forwardly by reaction without injuring the material engaged by the follower.

11. A celery trencher comprising a main frame mounted on ground wheels, an auxiliary frame carried by the main frame and having a casing extending downwardly into a trench when the machine is in use, a follower movable in the casing, and means connected with the follower, and adjustable, to resist the force applied to impart rearward movement to the follower.

12. A celery trench comprising a main frame mounted on ground wheels and having toothed posts, an auxiliary frame provided with gears meshing with the teeth of the said posts, means for actuating the said gears to adjust the auxiliary frame vertically on the main frame, and a casing carried by the auxiliary frame and adapted to extend downwardly into the trench, and a follower reciprocable in the lower portion of the casing.

13. A celery trench comprising a main frame mounted on ground wheels and having toothed posts, an auxiliary frame provided with gears meshing with the teeth of the said posts, means for actuating the said gears to adjust the auxiliary frame vertically on the main frame, a casing carried by the auxiliary frame and adapted to extend downwardly into the trench, above the trench a laterally projecting platform hinged to the upper portion of the casing, and a follower reciprocable in the lower portion of the casing.

14. A celery trencher comprising, a main wheeled frame, an auxiliary frame adjustable thereon and provided with upper and lower casing members, a follower reciprocable in the lower casing member, and a tiltable platform carried by the upper casing member.

15. A celery trencher comprising, a wheeled frame, upper and lower casing members, means carried by the upper casing member to facilitate the discharge of the celery in the lower casing member for moving successive charges of celery from said member into place in the trench, and means mounted on the frame and adjustable to engage one charge of celery after the follower has been moved forwardly preparatory to the placing of the next charge in the casing.

16. A celery trencher comprising, a framework, an upper casing member having a laterally projecting part provided with a tiltable platform, a lower casing member in communication at the top with the upper casing member, and a follower in the lower casing member.

17. A celery trencher comprising, a framework, an upper casing member having a laterally projecting part provided with a tiltable platfrom, a lower casing member in communication at the top with the upper casing member, a follower in the lower casing member, a lever for actuating the follower, and means connected with the follower for engaging the earth and resisting in part the force applied to the follower.

18. A celery trencher comprising, a framework, an upper casing member having a laterally projecting part and provided with a tiltable platform, a lower casing member in communication at the top with the upper casing member, a follower in the lower casing member, means for actuating the follower, and means connected with the follower for resisting in part the force applied to the follower.

19. A celery trencher comprising, a framework, an upper casing member having a laterally projecting part and provided with a tiltable platform, a lower casing member in communication at the top with the upper casing member, a follower in the lower casing member, means for actuating the follower, and means connected with the follower for resisting in part the force applied to the follower, said last named means including a bar, a supporting guide, a rock shaft journaled in the bar, a lever arm fast on the rock shaft, and rearwardly extending arms having their forward extremities made fast to the said shaft.

20. A celery trencher comprising, a frame, a top casing member, a tiltable platform therein, a lower casing member in communication with the top casing member, a follower in the lower casing member, means for actuating the follower, and means for resisting in part the force applied to the follower.

In testimony whereof I affix my signature.

CARL P. WALLICK.

Copies of this patent may be obtained for five cents each, by addressing the "Commissioner of Patents, Washington, D. C."